Feb. 27, 1951

D. K. DEAN 2,543,001

CONTINUOUS DISTILLATION AND TREATMENT OF COMPOSITE LIQUIDS

Filed Aug. 15, 1942

INVENTOR
DION K. DEAN
BY
ATTORNEY

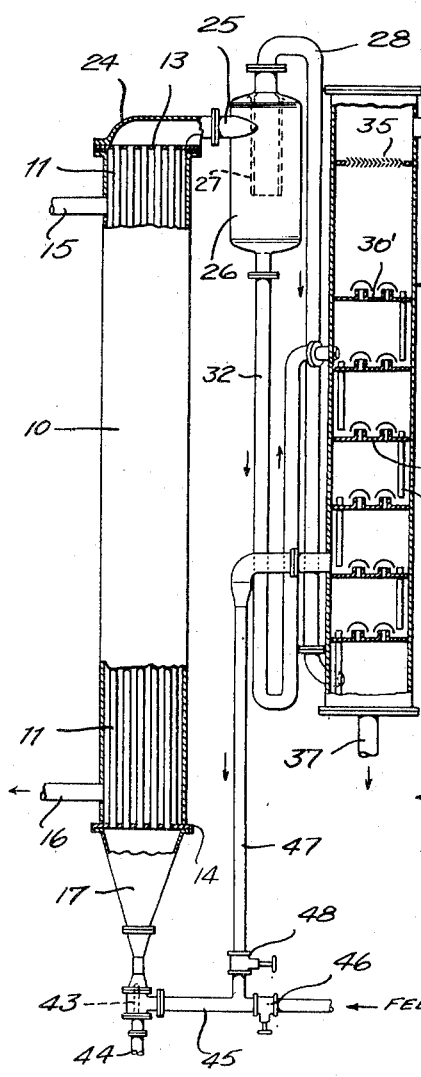

Patented Feb. 27, 1951

2,543,001

UNITED STATES PATENT OFFICE 2,543,001

CONTINUOUS DISTILLATION AND TREATMENT OF COMPOSITE LIQUIDS

Dion K. Dean, Rahway, N. J., assignor to Foster Wheeler Corporation, New York, N. Y., a corporation of New York Application August 15, 1942, Serial No. 455,014

12 Claims. (Cl. 202—40)

This invention relates to the continuous distillation and treatment of composite liquids such as hydrocarbon oils, fatty acids and the like.

In one aspect of the invention, the liquid to be distilled is caused to flow through a first stage of the system to a separator, and the separated liquid and vapor are delivered separately to a vapor and liquid contact device, constituting a second stage of the system, wherein they flow counter-current and in contact. If desired, a part of the liquid flowing through the contact device may be passed through a heater and returned to said device in such a manner that it will pass counter-current and in contact with the vapor in the contact device.

In another aspect of the invention, the liquid is treated chemically or otherwise, by causing it to flow through the first stage of the system in admixture with a stripping or reactant vapor or gas, hereinafter referred to as "vapor," the mixture discharged therefrom then being delivered to the separator, and the separated liquid and vapor separately delivered to the vapor and liquid contact device wherein the vapor and liquid flow counter-current and in contact. In this form of the invention, part of the liquid flowing through the contact device may be withdrawn therefrom and recirculated through the first stage with fresh feed, thereby serving as a carrier of heat and assisting in the vaporization of the volatile constituents of the feed. Circulation through the system may be forced or thermo-syphon. If forced circulation is desired, an ejector is employed to introduce the vapor into the fresh feed and the expansive energy of the vapor is utilized to assist the circulation. Use of an ejector rather than the usual forced circulation pump results in a considerable reduction in the cost of the equipment and the elimination of appreciable maintenance charges. Another part of the liquid flowing through the contact device may be passed through a heater and returned to the contact device in such a manner that it will pass counter-current and in contact with vapor in the contact device. It will be understood that the invention is not limited to the aspects above set forth.

The invention will be understood from the following description when considered in connection with the accompanying drawing forming a part thereof and in which:

Fig. 2 is a view, similar to Fig. 1, of another form of the invention; and

Fig. 3 is a view also similar to Fig. 1, of a further form of the invention.

Like characters of reference refer to the like parts throughout the views.

Figure 1:
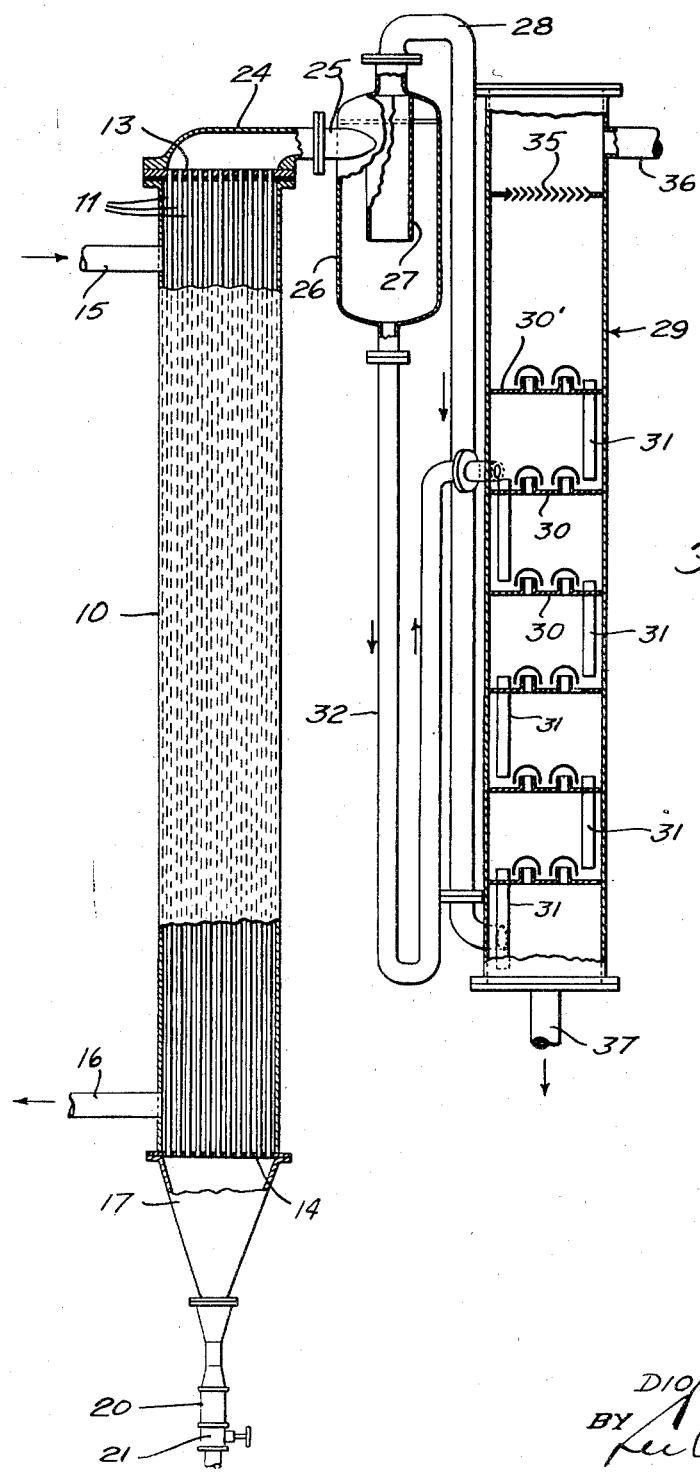
Fig. 1 is a more or less diagrammatic vertical sectional view with parts in elevation, of one form of apparatus embodying the invention.

Referring to the drawings, reference character 10 designates a shell and tube heater or treating member having tubes 11, which in the form shown, are vertically disposed and are secured at their opposite ends to tube plates 13 and 14. Connected adjacent the upper and lower portions of the shell are conduits 15 and 16 which provide an inlet and an outlet respectively for a heating medium, such as the vapor of a high temperature boiling point liquid, which flows in heat exchange relationship with the external surface of the tubes 11. A diffusing cone 17 is secured to the lower end of the shell, and connected to the smaller end of this cone in the form of the invention shown in Fig. 1, is a conduit 20 controlled by a valve 21 through which feed stock is introduced into the system. At the upper end of the member 10 is a head 24 which discharges tangentially through an outlet 25 into the upper end portion of a cyclone type liquid and vapor separator 26. Concentrically disposed within the upper part of the separator is a conduit 27 through which separated vapor flows from the separator. The outlet end of conduit 27 connects with one end of a conduit 28, the other end of which is connected to the lower portion of a stripping or reaction tower 29 having any suitable form of packing, or any suitable catalyst therein. As shown, the tower has a plurality of bubble trays 30 of usual construction and a clean-up tray 30' above the trays 30. Separated liquid is conducted from the lower portion of the separator 26 through a conduit 32 to the upper bubble tray 30 in the tower 29. The conduit 32 is shaped to provide a liquid seal between the separator and the tower and is of sufficient length to prevent the flow of vapor therethrough from the separator. Downcomers 31 on the bubble trays 30 conduct liquid downwardly through the tower from tray to tray. Vapors constituting one product and flowing upwardly from the clean-up tray in the tower 29, pass between baffle plates 35 to eliminate entrained moisture and flow from the upper portion of the tower through a conduit 36 through which they will be conducted to condensing apparatus, not shown. A second finished product is withdrawn from the bottom of the tower through a conduit 37.

In operation, the feed stock having a high boiling point component and a low boiling point component enters the system, in the form of the invention shown in Fig. 1, under pressure through the cone 17 wherein it is distributed uniformly over the inlet ends of the tubes of the member 10. The feed stock, which is under pressure sufficient to cause it to be passed through the tubes 11, flows through these tubes and is heated therein to a temperature sufficiently high to vaporize the low boiling point component but not so high as to vaporize the high boiling point component. The mixture of vapor and liquid flowing from the upper ends of the tubes 11 is delivered to the separator 26 wherein the liquid is separated from the vapor, the separated liquid flowing from the separator through the looped conduit 32 and discharging onto the uppermost bubble tray 30 of the tower 29. The vapor separated from the mixture, passes through the conduit 28 to the bottom of the tower 29, wherein it flows upwardly counter-current to and in contact with the descending liquid. The vapors thereby assist in the distillation of the higher boiling point component by serving as a stripping medium, passing through the heated higher boiling component and thereby reducing the partial pressure of vaporization of the higher boiling point component. The higher boiling component may be recirculated through the tower 29, if desired. This may be done by withdrawing liquid from a lower tray 30 in the tower 29 through a conduit 38 by means of a pump 39 and thereafter passing the liquid into a heater 40 through a conduit 41 as shown in Fig. 3. After being heated, the liquid is passed through a conduit 42 to an upper tray 30 in the tower 29 whence it descends with the liquid entering the tower through the conduit 32.

In the form of the invention shown in Fig. 2, the liquid is not only distilled but is treated chemically or otherwise. In this form of the invention, an ejector 43 having a gas or vapor inlet connection 44 is connected to the lower end of the diffusing cone 17. Feed stock is introduced into the system and is conducted to the suction side of the ejector 43 through a conduit 45 which is controlled by a valve 46. In operation, the feed stock enters the system through the conduit 45 and is drawn therethrough by the suction produced by the ejector 43 to which vapor is supplied under pressure. The feed material is forced through the ejector at an appreciable velocity so that the pressure of the vapor and liquid mixture is increased as the mixture enters the diffusing cone 17. The diffusing cone performs the double function of converting the velocity head into a pressure head and of distributing the vapor and liquid mixture substantially uniformly over the inlet ends of the tubes of the member 10. The pressure developed by the action of the ejector should be sufficient to force the mixture through the tubes 11 wherein the mixture is treated, or is heated to the temperature desired, or both. If a non-reactant vapor such as steam is delivered to the ejector, the effect on the feed material in addition to increasing its velocity of flow through the tubes 11, is to assist distillation therein by reducing its partial pressure of vaporization. If a reactant vapor is employed, a chemical action also will take place in the tubes 11. The mixture flowing from the upper ends of the tubes 11, is delivered to the separator 26 wherein the liquid is separated from the vapor, the separated liquid flowing from the separator through the looped conduit 32, and discharging onto the uppermost bubble tray 30 of the tower 29, as in the form of the invention shown in Fig. 1. The vapor separated from the mixture, which will be a mixture of vaporized feed material and the vapor delivered to the ejector, passes through the conduit 28 to the bottom of the tower 29, wherein it flows upwardly countercurrent to and in contact with the descending liquid, thus providing further contact of the liquid and vapor and insuring completion of the chemical treatment of the liquid when a reactant vapor is employed, or the saturation of the stripping medium.

As shown in Fig. 2, liquid may be conducted from a lower tray 30 in the tower 29 to the feed line 45 by a conduit 47 which is controlled by a valve 48. When the valve 48 is open, liquid is conducted through the conduit 47 to the feed line 45 and is recycled through the member 10 with the fresh feed. The recycled liquid functions as a carrier of heat to assist in the vaporization of the volatile constituents of the fresh feed.

In the form of the invention shown in Fig. 2, the tower 29 is disposed at a somewhat higher elevation than the member 10, and the inlet of the return conduit 47 is at a substantial elevation above the feed conduit 45. Due to the "vapor lift" in the member 10, the head due to the column of liquid in the return conduit 47 will be greater than the head due to the column of vapor and liquid mixture in the member 10 measured between the point of mixture of the vapor and liquid at the lower end of the diffusing cone 17 and the uppermost point of the device. Hence, recirculation between the tower and the device is not dependent upon the action of the ejector, although in normal operation, recirculation is a function of the ejector assisted by the head due to the column of liquid in the return conduit 47.

If desired however, the apparatus may be so arranged that the circulation between the tower and the treating device is entirely thermal, in which event the ejector is omitted and the length of the return column 47 must be sufficient to induce circulation through the treating member and the tower 29. For example, if the distance between the uppermost point of the member 10 and the inlet end of the column 47 is 10 ft., and vapor is formed within the tubes 11, and vapor is introduced at the lower end of the diffusing cone 17 in an amount such that the mean density of the vapor and liquid mixture between the top of the tubes 11 and the feed conduit 20 is onehalf of the density of the liquid in the return column 47, the minimum length of the column 47 necessary to induce circulation will be approximately 5 ft., although friction losses may require a slight increase in this length.

The apparatus and arrangement thereof in the form of the invention shown in Fig. 3 is similar to that illustrated in Fig. 2, but liquid is withdrawn from a lower tray 30 in the tower 29 through the conduit 38 by a pump 39 and thereafter is passed into the heater 40 through the conduit 41. From the heater, the liquid is passed through the conduit 42 to an upper tray 30 in the tower 29 wherein it flows downwardly from tray to tray, the vapor from the conduit 28 flowing upwardly counter-current to and in contact with the descending liquid introduced into the tower from the conduits 32 and 42.

The expression "vapor" as used in the claims when applied to the introduction of vapor into the feed liquid prior to heating, includes within its scope, vapor and gas, whether or not it is reactant or non-reactant wtih respect to the liquid under treatment.

It will be understood that changes may be made in the form, location and relative arrangement of the several parts of the apparatus disclosed, and in the sequence of the steps of the method disclosed, without departing from the principles of the invention. Accordingly the invention is not to be limited excepting by the scope of the appended claims.

What is claimed is:

1. Apparatus of the character described, comprising a heater, means for introducing liquid to be treated into the heater, a separator for separating liquid and vapors, means for conducting heated vapor and liquid mixture from the heater to the separator, a vapor and liquid contact device, means for conducting the separated liquid from the separator to said device, means for separately conducting separated vapor from said separator to said device wherein the vapor is caused to contact the liquid introduced therein, reheating means, means for conducting liquid from said device to the reheater, means for conducting the reheated liquid to said liquid contact device wherein said reheated liquid is contacted by the vapor in said device, and means for withdrawing treated liquid from said device.

2. Apparatus of the character described, comprising a member having a substantially vertically extending path of flow for liquid to be treated, a diffusing cone at the lower end of the member, a liquid feed conduit connecting with the inlet end of the cone, means for introducing vapor into the feed liquid, a separator for separating liquid and vapors, means for conducting vapor and liquid mixture from said member to the separator, a bubble tower, means for conducting the separated liquid from the separator to the upper part of the tower, means for separately conducting separated vapor from said separator to the lower part of the tower, the arrangement being such that the liquid flows counter-current to and in contact with the vapor in the tower, means for conducting liquid from a lower portion of the tower to the feed conduit, heating means, means for conducting liquid from the lower part of the bubble tower to the heating means, means for conducting liquid from the heating means to the upper part of the bubble tower, the arrangement being such that the liquid flows counter-current to and in contact with the vapor in the tower, and means for withdrawing treated liquid from the tower.

3. The method of treating liquids having components of different boiling points which comprises passing the liquid through a heating zone, vaporizing a component of said liquid in the heating zone, thereafter separating the vapor and liquid, passing the separated vapor and separated liquid in contact with each other in a contacting zone, withdrawing liquid from the contacting zone after it has come in contact with vapor therein, circulating said withdrawn liquid through a reheating zone, passing the reheated liquid in contact with the vapor in said contact zone, and withdrawing treated liquid from the contacting zone.

4. The method of treating liquids which comprises passing the liquid mixed with vapor through a heating zone, thereafter separating the vapor and liquid from the mixture, passing the separated vapor and separated liquid in contact with each other in a contacting zone, withdrawing liquid from the contacting zone after it has come in contact with vapor therein, circulating said withdrawn liquid through a reheating zone, passing the reheated liquid in contact with the vapor in said contact zone, and withdrawing treated liquid from the contacting zone.

5. The method of treating liquids which comprises passing the liquid mixed with vapor through a heating zone, thereafter separating the vapor and liquid from the mixture, passing the separated vapor and separated liquid in contact with each other in a contacting zone, withdrawing liquid from the contacting zone after it has come into contact with vapor therein, recirculating a portion of said withdrawn liquid through the heating zone mixed with liquid to be treated, passing another portion of the withdrawn liquid through a preheating zone, flowing the reheated liquid in contact with the vapor in the contact zone, and withdrawing treated liquid from the contacting zone.

6. Apparatus of the character described, comprising a heater, means for introducing liquid to be treated into the heater, a separator for separating liquid and vapor, means for conducting heated vapor and liquid mixture from the heater to the separator, a vapor and liquid contact device, means for conducting the separated liquid from the separator to said device, means for separately conducting separated vapor from said separator to said device wherein the vapor is caused to contact the liquid introduced therein, reheating means, means for conducting liquid from said device to the reheater, means for conducting the reheated liquid to said vapor and liquid contact device wherein said reheated liquid is contacted by the vapor in said device, means for withdrawing treated liquid from said device, and means for conducting at least some of said treated liquid from said device to said means for introducing liquid into the heater.

7. Apparatus of the character described comprising a heating member having a substantially vertically extending path of flow for liquid to be treated, a diffusing cone at the lower end of the member, a liquid feed conduit connecting with the inlet end of the cone, means for introducing vapor into the feed liquid, a separator for separating liquid and vapors, means for conducting vapor and liquid mixture from said member to the separator, a vapor and liquid contact device comprising a column in which vapor and liquid flow countercurrent to one another, means for conducting the separated liquid from the separator to the upper part of the column, means for separately conducting separated vapor from said separator to the lower part of the column, reheating means, means for conducting liquid from the lower part of the column to the reheating means, means for conducting liquid from the reheating means to the column at a point above said lower part of the column, the arrangement being such that liquid flows countercurrent to and in contact with the vapor in the column, and means for withdrawing treated liquid from the column.

8. Apparatus of the character described comprising a heating member having a substantially vertically extending path of flow for liquid to be treated, a liquid feed conduit connected to the lower end of said path of flow, a separator for separating liquid and vapors positioned adjacent the upper end of said path of flow, means for conducting the vapor and liquid mixture from said member to the separator, a vapor and liquid contact device comprising a column in which vapor and liquid flow countercurrent to one another, means for conducting the separated liquid from the separator to the upper part of the column, means for separately conducting separated vapor from said separator to the lower part of the column, reheating means, means for conducting liquid from the lower part of the column to the reheating means, means for conducting liquid from the reheating means to the column at a point above said lower part of the column, the arrangement being such that liquid flows countercurrent to and in contact with the vapor in the column, and means for withdrawing treated liquid from the column.

9. Apparatus of the character described, comprising a heater, means for introducing liquid to be treated into the heater, vapor ejector means associated with said heater for introducing vapor into the liquid and the vapor and liquid mixture into the heater, a separator for separating liquid and vapors, means for conducting heated vapor and liquid mixture from the heater to the separator, a vapor and liquid contact device, means for conducting the separated liquid from the separator to said device, means for separately conducting separated vapor from said separator to said device wherein the vapor is caused to contact the liquid introduced therein, reheating means, means for conducting liquid from said device to the reheater, means for conducting the reheated liquid to said liquid and contact device wherein said reheated liquid is contacted by the vapor in said device, and means for withdrawing treated liquid from said device.

10. Apparatus of character described comprising a heating member having a substantially vertically extending path of flow for liquid to be treated, a diffusing cone at the lower end of the member, vapor ejector means, means for introducing liquid to be treated into said ejector, said vapor ejector means being associated with the apex end of said cone so as to introduce the vapor and liquid mixture into said cone, a separator for separating liquid and vapors, means for conducting vapor and liquid mixture from said member to the separator, a vapor and liquid contact device comprising a column in which vapor and liquid flow countercurrent to one another, means for conducting the separated liquid from the separator to the upper part of the column, means for separately conducting separated vapor from said separator to the lower part of the column, reheating means, means for conducting liquid from the lower part of the column to the reheating means, means for conducting liquid from the reheating means to the column at a point above said lower part of the column, the arrangement being such that liquid flows countercurrent to and in contact with the vapor in the column, and means for withdrawing treated liquid from the column.

11. Apparatus of the character described comprising a heating member having a substantially vertically extending path of flow for liquid to be heated, a diffusing cone at the lower end of the member having an inlet at its apex end, an ejector having a discharge outlet at one end thereof in communication with the cone inlet, a vapor inlet at the opposite end thereof and a feed liquid inlet intermediate the vapor inlet and discharge outlet, the ejector being constructed and arranged to draw feed liquid thereinto through said liquid inlet and into admixture with vapor by the velocity of vapor under pressure flowing from said vapor inlet to the discharge outlet of the ejector and to impart velocity to said mixture discharged from the ejector through the discharge outlet by the initial expansive energy of the vapor, a feed liquid conduit communication with the feed liquid inlet of the ejector, a source of vapor under pressure communicating with the vapor inlet of the ejector, a separator adapted to separate liquid and vapors, means for conducting vapor and liquid mixture from said member after heating therein to the separator, a bubble tower, means for conducting the separated liquid from the separator to the upper part of the tower, means for separately conducting separated vapor from said separator to the lower part of the tower, the arrangement being such that the liquid flows counter-current to and in contact with the vapor in the tower, means for conducting liquid from a lower portion of the tower to the feed conduit, and means for withdrawing treated liquid from the tower.

12. Apparatus of the character described comprising a heating member having a substantially vertically extending path of flow for liquid to be heated, a diffusing cone at the lower end of the member having an inlet at its apex end, an ejector having a discharge outlet at one end thereof in communication with the cone inlet, a vapor inlet at the opposite end thereof and a feed liquid inlet intermediate the vapor inlet and discharge outlet, the ejector being constructed and arranged to draw feed liquid thereinto through said liquid inlet and into admixture with vapor by the velocity of vapor under pressure flowing from said vapor inlet to the discharge outlet of the ejector and to impart velocity to said mixture discharged from the ejector through the discharge outlet by the initial expansive energy of the vapor, a feed liquid conduit communicating with the feed liquid inlet of the ejector, a source of vapor under pressure communicating with the vapor inlet of the ejector, a separator adapted to separate liquid and vapors, means for conducting vapor and liquid mixture from said member after heating therein to the separator, a bubble tower, means for conducting the separated liquid from the separator to the upper part of the tower, means for separately conducting separated vapor from said separator to the lower part of the tower, the arrangement being such that the liquid flows counter-current to and in contact with the vapor in the tower, a conduit in communication with the lower portion of said tower and said feed conduit for conducting liquid from a lower portion of the tower to the feed conduit, said conduit being in communication with the tower at a substantially higher elevation than its point of communication with the feed conduit and having a substantially vertically extending portion of sufficient length to provide circulation through said member and bubble tower, and means for withdrawing treated liquid from the tower.

DION K. DEAN.

REFERENCES CITED

The following references are of record in the file of this patent:

UNITED STATES PATENTS

| Number | Name | Date |
|---|---|---|
| 1,169,122 | Buchert | Jan. 25, 1916 |
| 1,666,051 | Deppe et al. | Apr. 10, 1928 |
| 1,951,840 | Roberts et al. | Mar. 20, 1934 |
| 1,986,165 | Sieck, Jr. | Jan. 1, 1935 |
| 2,095,578 | Theiler | Oct. 12, 1937 |
| 2,164,593 | Rector | July 4, 1939 |
| 2,224,984 | Potts et al. | Dec. 17, 1940 |
| 2,224,986 | Potts et al. | Dec. 17, 1940 |